Figure 1:
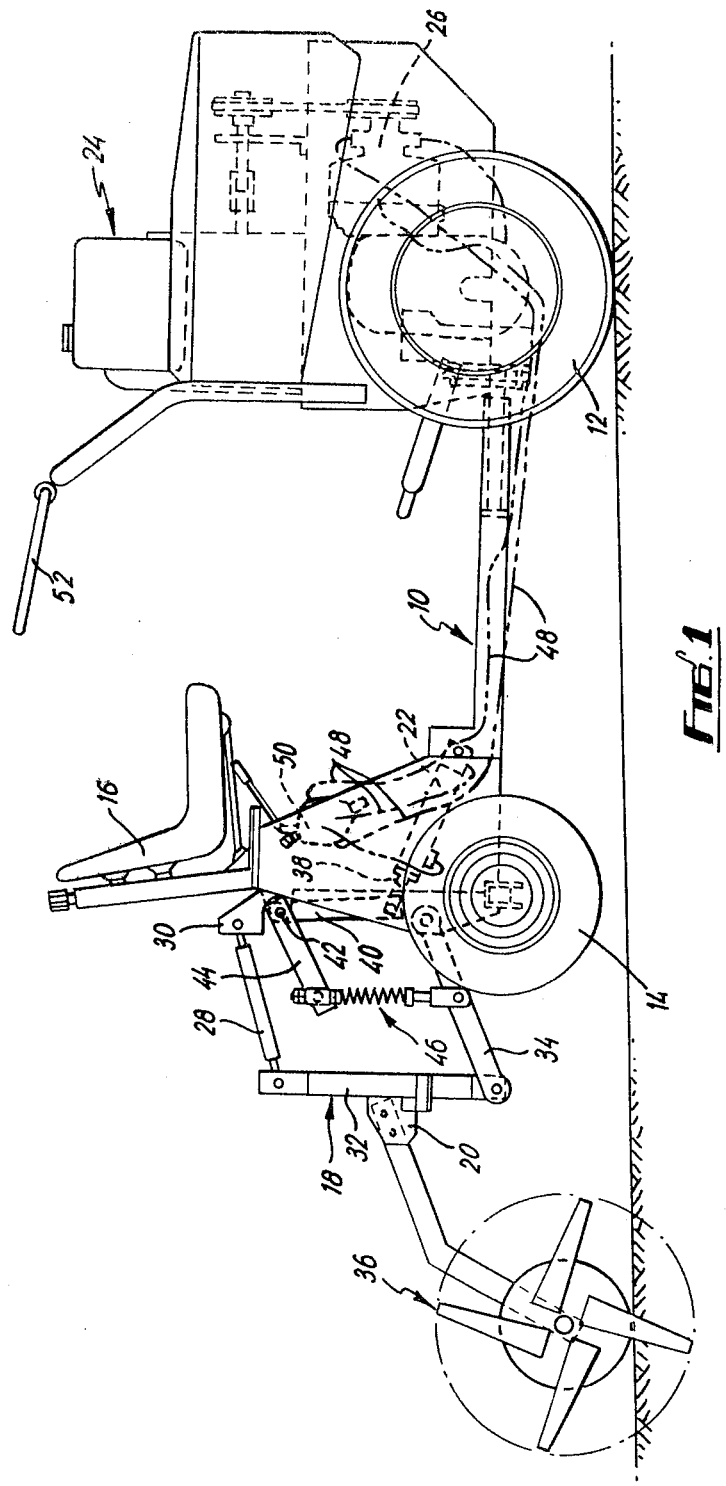

United States Patent [19]

Staniforth et al.

[11] 4,424,868

[45] Jan. 10, 1984

[54] TURF-TREATMENT APPARATUS

[75] Inventors: Eric Staniforth; Douglas A. Everett, both of Macclesfield, England

[73] Assignee: Sisis Equipment (Macclesfield) Ltd., Chelshire, England

[21] Appl. No.: 290,897

[22] Filed: Aug. 7, 1981

[51] Int. Cl.³ .............................................. A01B 45/04
[52] U.S. Cl. ..................................... 172/21; 172/257; 172/678; 180/209; 280/405 B
[58] Field of Search ................... 172/21, 22, 257, 307, 172/417, 484, 497, 500, 502, 624.5, 678; 280/405 R, 405 B; 180/209

[56] References Cited

U.S. PATENT DOCUMENTS

| | | | |
|---|---|---|---|
| 2,886,114 | 5/1959 | Peterson | 172/307 X |
| 3,131,492 | 5/1964 | Speicher et al. | 280/405 R X |
| 3,570,604 | 3/1971 | Allard et al. | 172/22 |
| 3,650,332 | 3/1972 | Dedoes | 172/22 |
| 3,652,106 | 3/1972 | Waterman | 280/405 R |
| 4,116,140 | 9/1978 | Anderson et al. | 172/500 X |

Primary Examiner—Richard T. Stouffer
Attorney, Agent, or Firm—Alan H. Levine

[57] ABSTRACT

A powered mobile unit for turf-care apparatus comprises a chassis, driven and steerable front wheels, rear wheels supporting the chassis, a seat carried at least mainly by the rear wheels, a linkage behind the rear wheels for the attachment of turf-treating implements; and a powered hydraulic unit capable of activating the linkage to lift an attached implement clear of the ground and of applying such downward pressure to the implement as to cause the rear wheels to be raised clear of the ground with an operator in the seat, while the unit is mobile.

7 Claims, 2 Drawing Figures

TURF-TREATMENT APPARATUS

This invention is concerned with turf-care apparatus comprising a powered mobile unit to which may be attached turf-working implements or turf-treatment appliances for towing over an area of turf, either in operative position or raised clear of the ground. More specifically the invention is concerned with the powered mobile unit.

Such turf-care apparatus is known comprising a tractor to which implements and appliances may be attached. The tractor has a pair of rear driven ground wheels, and a steerable front wheel. When being used to tow such implements as coring drums, aerators, spikers and so on penetration of the implement is frequently inadequate, accompanied by loss of traction due to the load on the driven ground wheels being reduced by the action of the implement. It is, therefore, in such circumstances, necessary to add weights to the towed implement. When it is wished to lift the implement clear of the ground however the weights must be removed in case the combined effect of the implement and the weights cause the steerable front wheel to be raised clear of the ground.

It has also been proposed resiliently to load turf-treatment implements hitched to and towed by a tractor.

The object of the present invention is to provide a powered mobile unit for turf-care apparatus of the type described which facilitates substantial loading of a towed implement to aid penetration and, at the same time, improved traction.

According to the present invention a powered mobile unit for turf-care apparatus comprises: a chassis driven and steerable front wheel means and rear wheel means supporting the chassis; a seat for an operator, carried at least mainly by said rear wheel means; a linkage behind said rear wheel means adapted for the hitching thereto of turf-treatment implements which are required to penetrate turf; and powered hydraulic means capable of activating said linkage so as to lift a hitched turf-treatment implement clear of the ground behind said rear wheel means, or of applying such downward pressure to such implement as to cause rear wheel means to be raised clear of the ground with an operator occupying said seat, in either case while the unit is mobile.

Figure 2:
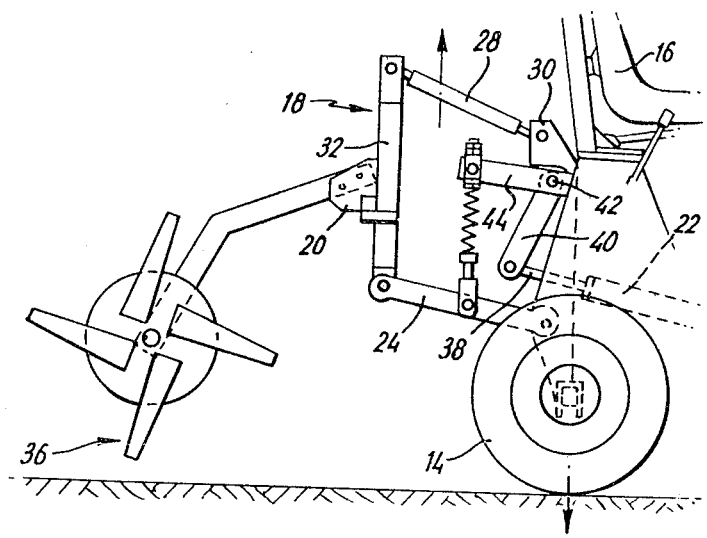

The powered mobile unit itself may conveniently incorporate one or more of the following optional features:
 (a) a pair of steerable front wheels, or a single steerable front wheel
 (b) an internal combustion engine mounted above the front wheel means for driving same
 (c) a double-acting hydraulic cylinder for activating said linkage
 (d) a common power source for the driven front wheel means and the hydraulic means
 (e) resilient shock absorbing means in the linkage As typical accessories for the powered mobile unit the following may be provided:
 (a) a hollow timer
 (b) a shallow slitter
 (c) a deep slitter
 (d) a roller
 (e) a scarifier
 (f) a brush The invention will now be described further, by way of example only, with reference to the accompanying drawing, in which:

FIG. 1 is a diagrammatic side elevation of a powered mobile unit, for turf-care apparatus, constructed in accordance with the invention and in use deep slitting turf; and FIG. 2 is a detail view of the rear end of the unit shown in FIG. 1 with certain parts in different positions.

The unit basically comprises a chassis 10, a pair of steerable front wheels 12, and a pair of rear wheels 14, all supported by the chassis 10, a seat 16 for an operator, mounted directly above the rear wheels 14, a linkage 18 also carried by the chassis 10 and located behind the rear wheels 14, and having attachment plates 20 to which a turf-treatment implement or appliance may be hitched, a double-acting hydraulic cylinder 22 connected between the chassis 10 and the liinkage 18, an internal combustion engine 24 for driving the front wheels 12, and a gear-box 26 between the engine 24 and wheels 12, which also constitute the reservoir for the cylinder 22.

The linkage consists of a central turnbuckle 28 pivotally connected to an attachment plate 30 at the rear of the chassis 10, an A-frame 32 pivotally connected to the other end of the turnbuckle 28, and two further links 34 pivotally connected between the lower ends of the A-frame 32 and the rear of the chassis 10. A deep slitter 36 is shown hitched to the attachment plates 20.

The hydraulic cylinder 22 has a ram 38 the outer end of which is pivotally connected to a lever 40 extending radially from a shaft 42 extending across the rear of the chassis. The shaft 42 also carries two further levers 44 each of which is pivotally connected to an adjustable spring shock absorber 46 the other ends of which is pivotally connected to the respective links 34.

The hydraulic cylinder 22 is pivotally connected to the chassis and there are suitable conduits 48 between the cylinder 22 and the gear box 26 and a control switch 50.

In use an operator occupies the seat 16 and when driving to and from a work location (say a golf green) the switch 50 is operated to cause the ram 38 to be extended which raises the linkage 18 which in turn lifts the hitched implement clear of the ground. All the wheels of the unit are on the ground and the unit proceeds normally under power, the front wheels 12 being steered by handle 52. This situation is shown in FIG. 2. When it is wished to use the implement the switch 50 is operated to move the ram 38 in the opposite direction whereby the implement, in this case the slitter 36, is lowered to the ground. Now the weight of the implement also is often not sufficient to ensure the necessary penetration of the turf as the latter is traversed and as the implement rotates. However by means of the cylinder 22 and ram 38 further downward pressure may be applied to the implement, and indeed such pressure as causes the rear wheels 14 to be raised off the ground as shown in FIG. 2.

In this position the weight of the entire unit and the operator is carried by the implement and the front wheels 12 which assists in achieving maximum penetration, good traction and responsive steering with the operator seat preferably arranged as above described and shown in FIG. 1 to dispose the weight of the operator substantially directly above the rear wheels.

As mentioned the implement in the instance being particularly described is a deep slitter. However a variety of implements and appliances will be provided (such as those listed hereinbefore) to enable the apparatus to be used for carrying out a full range of turf-care treatments.

We claim:

1. Turf treatment apparatus comprising in combination: a tractor unit including a rear hitch arrangement and a turf treating implement detachably secured to the hitch; said tractor unit comprising a chassis having drivable and steerable front wheel means and freely rotatable rear wheel means, an operator seat carried mainly by said rear wheel means and arranged to dispose the weight of an operator substantially directly above said rear wheel means, the hitch arrangement being powered from a prime mover of the tractor unit to enable the combination to be disposed in a first travel configuration, wherein both the front and rear wheel means engage the ground and support the combination with the treating implement lifted clear of the ground, and a second working configuration, wherein the front wheel means and the treating implement engage the ground and said rear wheel means are lifted clear of the ground, and the combination being powered by the front wheel means to cause operative movement of the treating implement by frictional engagement with the ground, the hitch arrangement supplying such downward pressure to the implement as to cause the rear wheels to be raised clear of the ground even when an operator occupies said seat such that the weight of the operator and the entire unit would assist in applying a load to the treating implement sufficient to insure maximum penetration thereof; said prime mover of the tractor unit and associated tractor unit parts being arranged directly over said front wheel means to insure responsive steering and good traction of the combination.

2. A powered mobile unit as claimed in claim 1, further, wherein the prime mover includes an internal combustion engine mounted above the front wheel means for driving same.

3. A powered mobile unit as claimed in claim 1 wherein the hitch arrangement includes a double acting hydraulic cylinder.

4. A powered mobile unit as claimed in claim 2, wherein the hitch arrangement includes a hydraulic means and a common power source is provided for the hydraulic means and the front wheel means.

5. A powered mobile unit as claimed in claim 1 wherein the hitch arrangement includes a parallelogram linkage.

6. A powered mobile unit as claimed in claim 5, including resiilient shock-absorbing means in the linkage.

7. A powered mobile unit as claimed in claim 6, wherein the resilient shock-absorbing means includes a tension spring having lower and upper ends, the lower end being connected to a lower link of the linkage and the upper end being adapted for application thereto of a lifting force.

* * * * *